(12) United States Patent
Campanelli

(10) Patent No.: US 7,516,936 B2
(45) Date of Patent: Apr. 14, 2009

(54) LENS MOLDS WITH COATING

(75) Inventor: Giovanni Campanelli, Grossostheim (DE)

(73) Assignee: Novartis AG, Basel (CH)

( * ) Notice: Subject to any disclaimer, the term of this patent is extended or adjusted under 35 U.S.C. 154(b) by 47 days.

(21) Appl. No.: 11/412,650

(22) Filed: Apr. 27, 2006

(65) Prior Publication Data

US 2006/0244162 A1   Nov. 2, 2006

(30) Foreign Application Priority Data

Apr. 29, 2005   (EP)   ................... 05009458

(51) Int. Cl.
  *B29D 11/00*   (2006.01)
(52) U.S. Cl. .................. 249/114.1; 249/115; 425/808; 106/38.2; 106/38.22
(58) Field of Classification Search ...... 249/114.1–117, 249/134, 135; 425/408, 412, 43, 90, 808, 425/406; 264/131, 338, 1.1, 1.32, 2.5, 1.36, 264/1.38, 2.6, 39, 334, 494, 496; 204/298.02; 118/214, 254, 29; 427/135, 167, 490, 537, 427/567, 578, 133; 65/443, 529; 106/38.2, 106/38.22, 38.27, 38.9
See application file for complete search history.

(56) References Cited

U.S. PATENT DOCUMENTS

| 3,458,348 | A | * | 7/1969 | Sherman ..................... 428/422 |
| 4,139,677 | A | * | 2/1979 | Blair et al. .................. 428/409 |
| 4,168,961 | A | * | 9/1979 | Blair .............................. 65/66 |
| 4,197,266 | A | * | 4/1980 | Clark et al. .................. 264/2.2 |
| 4,287,175 | A | * | 9/1981 | Katz ........................... 424/428 |
| 4,312,575 | A | * | 1/1982 | Peyman et al. .......... 351/160 H |
| 4,598,122 | A | * | 7/1986 | Goldenberg ................ 525/61 |
| 4,629,489 | A | * | 12/1986 | Hirota et al. .................. 65/102 |
| 4,661,573 | A | * | 4/1987 | Ratkowski et al. .......... 526/245 |
| 4,721,518 | A | * | 1/1988 | Monji et al. ............. 65/374.11 |
| 4,747,864 | A | * | 5/1988 | Hagerty et al. ................ 65/102 |
| 4,865,779 | A | * | 9/1989 | Ihn et al. ..................... 264/1.1 |
| 4,955,580 | A | | 9/1990 | Seden et al. .................. 249/82 |
| 4,964,903 | A | * | 10/1990 | Carpenter et al. ............ 65/275 |
| 4,978,713 | A | * | 12/1990 | Goldenberg ................ 525/61 |
| 5,087,279 | A | * | 2/1992 | Monji et al. .................... 65/64 |
| 5,120,343 | A | * | 6/1992 | Monji et al. .................. 65/268 |
| 5,143,660 | A | | 9/1992 | Hamilton et al. ............. 264/1.4 |
| 5,192,352 | A | * | 3/1993 | Kuwabara et al. ......... 65/60.53 |
| 5,466,147 | A | * | 11/1995 | Appleton et al. ............ 425/412 |
| 5,508,317 | A | * | 4/1996 | Muller ......................... 522/85 |
| 5,542,978 | A | * | 8/1996 | Kindt-Larsen et al. ...... 118/256 |
| 5,593,781 | A | | 1/1997 | Nass et al. .................. 428/403 |
| 5,595,639 | A | * | 1/1997 | Sano et al. .................. 205/109 |

(Continued)

FOREIGN PATENT DOCUMENTS

DE    19746885 A1 *   6/1999

(Continued)

*Primary Examiner*—Philip C Tucker
*Assistant Examiner*—Dimple N Bodawala
(74) *Attorney, Agent, or Firm*—Jian Zhou; Robert Ambrose

(57) ABSTRACT

The present invention generally relates to a contact lens forming mold and to a method of producing contact lenses with higher production yield and improved quality. By coating a contact lens forming mold with a nano-structured fluorine-containing inorganic polycondensate coating solution the number of lens holes, such as voids or areas of non uniform thickness of a contact lens therein produced is substantially decreased.

7 Claims, 2 Drawing Sheets

U.S. PATENT DOCUMENTS

| | | | |
|---|---|---|---|
| 5,620,720 A | 4/1997 | Glick et al. | 425/408 |
| 5,644,014 A * | 7/1997 | Schmidt et al. | 528/43 |
| 5,672,363 A * | 9/1997 | Sagawa et al. | 425/3 |
| 5,779,943 A * | 7/1998 | Enns et al. | 264/1.7 |
| 5,849,222 A | 12/1998 | Jen et al. | 264/2.3 |
| 5,882,698 A * | 3/1999 | Su et al. | 425/215 |
| 6,008,285 A * | 12/1999 | Kasemann et al. | 524/430 |
| 6,099,283 A | 8/2000 | Soane et al. | 425/123 |
| 6,291,070 B1 * | 9/2001 | Arpac et al. | 428/412 |
| 6,310,116 B1 * | 10/2001 | Yasuda et al. | 523/106 |
| 6,475,410 B1 * | 11/2002 | Nakagawa | 264/2.5 |
| 6,511,617 B1 * | 1/2003 | Martin et al. | 264/1.36 |
| 6,565,776 B1 * | 5/2003 | Li et al. | 264/2.5 |
| 6,599,635 B1 * | 7/2003 | Mechtel et al. | 428/449 |
| 6,719,929 B2 * | 4/2004 | Winterton et al. | 264/1.7 |
| 6,855,396 B1 * | 2/2005 | Mennig et al. | 428/144 |
| 7,143,990 B2 * | 12/2006 | Matsuzawa et al. | 249/114.1 |
| 2002/0163619 A1 * | 11/2002 | Matsuzawa et al. | 351/159 |
| 2003/0203065 A1 * | 10/2003 | Buazza et al. | 425/174.4 |
| 2005/0173834 A1 * | 8/2005 | Lucek et al. | 264/319 |
| 2005/0206019 A1 * | 9/2005 | Hodgkinson | 264/1.1 |

FOREIGN PATENT DOCUMENTS

| | | |
|---|---|---|
| EP | 216074 A2 * | 4/1987 |
| EP | 1 136 222 A1 | 9/2001 |
| EP | 0 765 733 B1 | 5/2002 |
| WO | WO 98/42497 | 10/1998 |
| WO | WO0063312 A1 * | 10/2000 |

\* cited by examiner

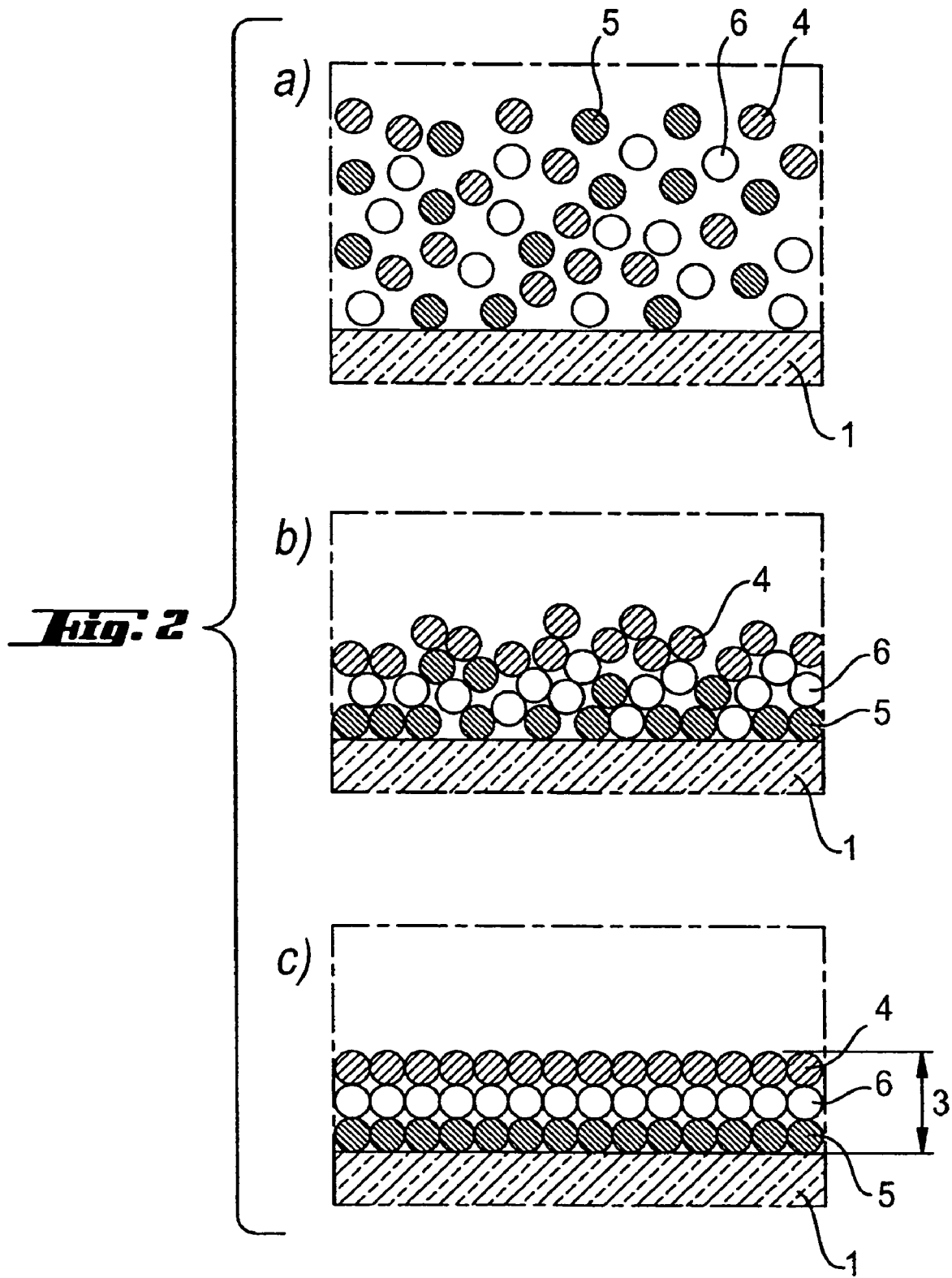

LENS MOLDS WITH COATING

This application claims benefit under 35 USC §119 of European patent application No. EP 05009458.0 filed Apr. 29, 2005, the contents of which are incorporated herein by reference.

The present invention generally relates to a contact lens forming mold and to a method of producing contact lenses with higher production yield and improved quality. By coating a contact lens forming mold with a nano-structured fluorine-containing inorganic polycondensate coating solution the number of lens holes, such as voids or areas of non uniform thickness of a contact lens therein produced is substantially decreased.

Contact lenses from a wide range of materials are nowadays produced in great volume in highly automated manufacturing facilities.

As this products are intended to be placed in the eye, great care is taken to make sure that they meet strict quality control standards. This may result in high rejection rate and low production yields. Therefore there is constantly a need to find cost efficient ways to control and minimize contact lens defects.

Contact lens defects in a highly automated production plants may be generated for several reasons, among them the filling and closing of the contact lens forming mold. Several attempts to reduce lens defects have been reported, e.g. coating of the optical surfaces of the contact lens forming molds to modify the surface properties of the molds.

In U.S. Pat. No. 5,849,222 for example the surface energy of hydrophobic contact lens forming molds is modified to increase wettability of the contact lens forming material by coating the molds with a surfactant. In general, the use of surface applied agents which improve the spreading and the wetting properties of a liquid is well known and widely exploited in connection with the manufacturing of contact lenses.

Nevertheless said known coated mold systems still leave room for improvement, particularly as regards the lens quality and the production yield.

Contrary to any prediction, it was found that decreasing the wettability by coating the molds with a nano-structured fluorine-containing inorganic polycondensate coating solution allows to substantially decrease the number of lens holes, such as voids or areas of non uniform thickness of a contact lens therein produced.

An object of the present invention is a contact lens forming mold which comprises two mold halves, female and male mold half, characterized in that at least a mold half of the mold is coated with a solution which modifies the surface energy characteristic of the surface thereby decreasing the wettability by a lens forming material.

Another object of the present invention is a method to form a contact lens comprising dosing the contact lens forming material into a contact lens forming mold, crosslinkning the material by actinically curing the mold thereby forming a contact lens. The method characterized in that at least one optical surface of contact lens forming mold is coated with a solution which modifies the surface energy characteristic of the surface thereby decreasing the wettability by the lens forming material.

In a preferred aspect of the invention, the coating is a nano-structured fluorine-containing inorganic polycondensate coating solution.

The solution preferably contains polycondensates based on one or more compounds of elements M of the main groups III to V and the subgroups II to IV of the periodic system of elements, said compounds being capable of hydrolytic polycondensation, whereby in these polycondensates, at least one organic group G having at least 2 aliphatic carbon atoms to which at least one fluorine atom is bonded, is bonded to at least part of the central atoms M either directly via one of the carbon atoms or via a linking group A.

The mold is preferably a reusable mold made of glass or quartz. The contact lens forming material is preferably a modified polyvinyl alcohol prepolymer as disclosed in EP-A-641806, for example nelfilcon (available from Ciba Vision Corporation, Atlanta, USA).

The solution is preferably the solution sold under the trade name of KERONA SICHTKLAR®(solution).

The contact lens is preferably manufactured within the coated mold in a highly automated contact lens production plant.

BRIEF DESCRIPTION OF THE DRAWING

FIG. 2 shows schematically how KERONA SICHTKLAR® solution distributes on a glass mold.

Contact lenses, which are to be manufactured economically in large unit numbers, are preferably manufactured by the so-called mold or full-mold process. In these processes, the lenses are manufactured into their final shape within a lens forming mold, so that there is no need to subsequently finish the surfaces of the lenses, nor to finish the edges. Molding processes are described for example in WO-A-87/04390 or in EP-A-0367513. After manufacture, the lens is inspected, then packaged and subjected to heat sterilisation.

Generally a contact lens forming mold comprises at least two mold halves, i.e. female and male mold half. The female mold half defines a first molding (or optical) surface and the male mold half defines a second molding (or optical) surface. The female and male mold halves are configured to receive each other such that a lens forming cavity is formed between the first molding surface and the second molding surface. The molding surface of a mold half is the cavity-forming surface of the mold and is in direct contact with lens-forming material. The two mold halves preferably are not touching each other but have a thin gap of annular design arranged between them. The gap is connected to the mold cavity, so that excess lens material can flow away into the gap. The two opposite surfaces of a contact lens are defined by the two optical surfaces while the edge is defined by the spatial limitation of actinic irradiation rather than by means of mold walls.

To manufacture a contact lens, first of all a certain amount of a flowable starting material is placed in a mold half, preferably the female mold half. Afterwards, the mold is closed by placing the other mold half thereon. The subsequent polymerisation or crosslinking of the starting material takes place by radiation with UV light, or by heat action, or by another non-thermal method.

According to the present invention at least one optical surface of the contact lens forming mold is coated with a solution which modifies the surface energy characteristic of the surface thereby decreasing the wettability by the lens forming material.

As a consequence of the coating, the spreading of the lens forming material towards the centre of the mold is retarded and the air inclusion during the closing of the mold is substantially decreased. This results in higher quality contact lenses with a reduced number of lens holes, such as voids or areas of non uniform thickness and ultimately in an improved production yield.

Figure 1A:
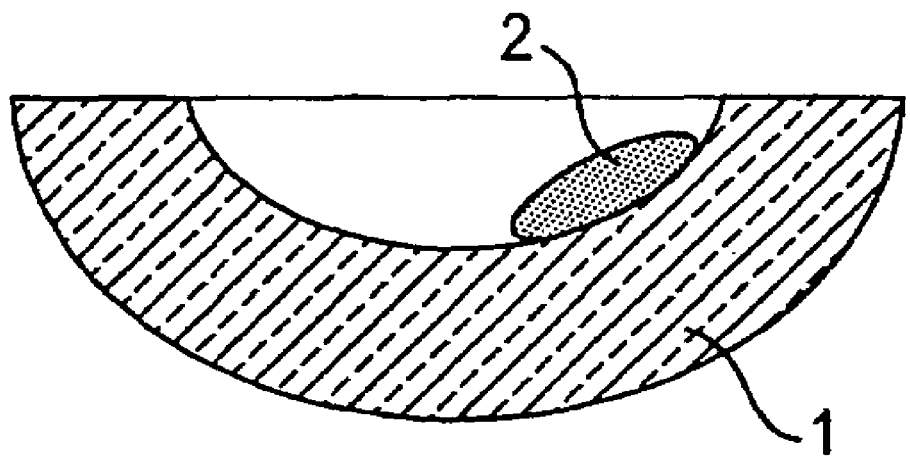
FIG. 1a shows a non coated female contact lens forming mold.
Figure 1B:
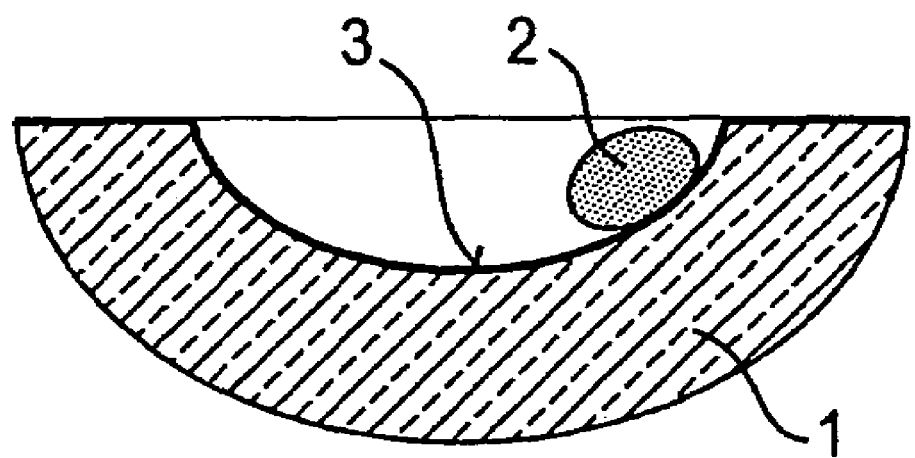
FIG. 1b shows a female contact lens forming mold coated according to the present invention.

FIG. 1a shows an un-coated female mold 1 made of glass. The hydrophilic contact lens forming material 2 spreads towards the center of the mold. FIG. 1b shows a glass female mold coated with KERONA SICHTKLAR® (solution) 3, the spreading of the hydrophilic contact lens forming material towards the center of the mold is retarded. The slower spreading of the lens forming material prevents the absorption of air bubbles while the mold is still open.

The coating solution which is employed may be schematically defined as an organic-inorganic nano-structured solution because it contains organic groups 4 bonded to inorganic groups 5 and encapsulating nano-particales 6. Given its organic-inorganic structure, the coating solution is suitable for forming a durable coating on both hydrophilic and hydrophobic substrates.

FIG. 2 shows schematically how the coating solution distributes on a glass forming mold 1. First the solution is spread on the mold, where the organic 4, inorganic 5 and nano-structured 6 components starts to orient. After the evaporation of the volatile compounds, the solution results in an ultra thin coating on the mold surface wherein the inorganic part 5 disposes in close contact with the hydrophilic substrate 1.

On the contrary the inorganic part 5 would remain exposed whenever a hydrophobic substrate is employed.

A decrease in wettability is therefore achieved when using the organic-inorganic nano-structured coating on a hydrophobic mold in combination with a hydrophobic contact lens forming material, or when using the organic-inorganic nano-structured coating on a hydrophilic mold in combination with a hydrophilic contact lens forming material.

The coating solution preferably contains a nano-structured fluorine-containing inorganic polycondensate solution.

More preferably the coating solution contains polycondensates of one or more compounds of elements M of the main groups III to V and the subgroups II to IV of the periodic system of elements, said compounds being capable of hydrolytic polycondensation, whereby in these polycondensates, at least one organic group G having at least 2 aliphatic carbon atoms to which at least one fluorine atom is bonded, is bonded to at least part of the central atoms M either directly via one of the carbon atoms or via a linking group A.

The element M from the main groups III to V and the subgroups II to IV of the periodic system of elements may be at least one element selected from silicon, aluminium, boron, tin, zirconium, titanium, vanadium and zinc, with Si, Al, Ti and Zr being preferred, and with Si being most preferred. In particular, preferably 75% to 100%, most preferably 90% to 100% of all central atoms of the polycondensates present in the coating composition are silicon, aluminium, titanium and/or zirconium atoms.

Usually, organic groups G are bonded to at least 0.1% (preferably at least 0.5% and most preferably at least 1%) of all the central atoms M present in the above polycondensates, said groups having at least 3 (preferably at least 4 and most preferably at least 5) aliphatic carbon atoms, to which respectively at least one and preferably at least two fluorine atoms are bonded. These groups G are preferably partly fluorinated alkyl and/or alkenyl groups. These groups may also be e.g. groups derived from fluorinated alkane and alkene acids. In these cases, they may be introduced into the polycondensates e.g. by forming a chelate of the corresponding acid with a starting compound of e.g. Al, Ti or Zr capable of hydrolysis, and the above compound group A is thus a chelate-forming group which leads to the structure

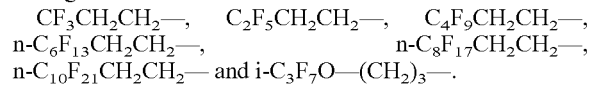

Examples of partly fluorinated groups G, which may be used according to the invention (and are also preferred according to the invention) are groups which possess aliphatic carbon atoms, to which a total of 2 to 30 (preferably 3 to 25, more preferably 5 to 20, most preferably 8 to 18) fluorine atoms are bonded, and which (at least in the case of the direct bonding of G to M) are each separated from the central atom M by at least 2 atoms (preferably carbon atoms).

In the above-indicated number of fluorine atoms which are bonded to aliphatic carbon atoms, those fluorine atoms that are possibly bonded in another way, e.g. to aromatic carbon atoms (e.g. in the case of $C_6F_4$) are not taken into account. It is also possible for one or more fluorine atoms to be found on one aliphatic carbon atoms, from which a double or triple bond is formed. With regard to the accessibility of the corresponding starting substances [i.e. the (partly) hydrolysable compounds of elements M], fluorine-containing groups are preferred, which are bonded directly to preferably silicon atoms. Specific examples of such fluorine-containing groups are e.g.:

$CF_3CH_2CH_2$—, $C_2F_5CH_2CH_2$—, $C_4F_9CH_2CH_2$—, n-$C_6F_{13}CH_2CH_2$—, n-$C_8F_{17}CH_2CH_2$—, n-$C_{10}F_{21}CH_2CH_2$— and i-$C_3F_7O$—$(CH_2)_3$—.

Of these groups, n-$C_6F_{13}CH_2CH_2$—, n-$C_8F_{17}CH_2CH_2$— and n-$C_{10}F_{21}CH_2CH_2$— are preferred in particular. Of course, other fluorine-containing groups G may also be used according to the invention, as well as mixtures of different fluorine-containing groups G.

Preferably, at least one (e.g. one or two) non-hydrolysable or non-hydrolysing organic group with a functional grouping Z is also found on at least one part of the central atoms M of the polycondensates. A "non-hydrolysing" organic group is understood to be a group which, in principle, is open to hydrolysis, but under the given conditions does not actually hydrolyse during the production of the polycondensates, the coating and the subsequent drying and/or curing. Examples of the latter groups include e.g. also the above chelate-forming groups A. Preferably one or two (preferably one) non-hydrolysable or non-hydrolysing groups (in addition to groups G) are respectively bonded to at least 0.1% and preferably at least 0.5% of the central atoms M in the polycondensates. These groups may be selected e.g. from functionalised (substituted) alkyl (preferably $C_{1-4}$-alkyl, e.g. methyl, ethyl, propyl and butyl), alkenyl (preferably $C_{2-4}$-alkenyl, e.g. vinyl, 1-propenyl, 2-propenyl and butenyl), alkinyl (preferably $C_{2-4}$-alkinyl, e.g. ethinyl and propinyl) and functionalised aryl (preferably $C_{6-10}$-aryl, e.g. phenyl and naphthyl), whereby the groups that are different from alkyl groups and aryl groups may also optionally have one or more substituents [e.g. chlorine, bromine, hydroxy, alkoxy, epoxy, (optionally substituted) amino, etc.]. The above alkyl radicals also include the corresponding cyclic and aryl-substituted radicals, e.g. cyclohexyl and benzyl, while the alkenyl and alkinyl groups may similarly be cyclic and the said aryl groups should also include alkaryl groups (e.g. tolyl and xylyl). Especially preferred groups are groups which possess an (optionally multiply) unsaturated carbon-carbon bond and/or which have a highly reactive functional group such as epoxy. Of the unsaturated groups, those which possess a (meth) acryloxy radical, [preferably a (meth)acryloxy-$C_{1-4}$-alkyl radical, e.g. (meth)acryloxypropyl] may be mentioned in particular. The presence of such groups in the corresponding polycondensates has the advantage that after coating with the coating liquid, a double hardening effect can take place, namely a reaction between the functional groups Z [e.g. a thermally or photochemically induced linking of the unsaturated organic radicals by means of (radical) polymerisation or ring-opening polymerisation in the case of epoxide rings] and thermal completion of the polycondensation [e.g. by splitting water from M-OH-groups that are still present]. Of course, in the polycondensates, non-functionalised alkyl and aryl groups may also be present on central atoms M, especially those which are derived from long-chain saturated fatty acids (in this case they are preferably bound to the central atom through a chelate-forming group A).

Examples of hydrolysable groups in the starting compounds (which are used not necessarily as monomeric compounds, but already as appropriate precondensates of compounds of one or more elements M) are—in part dependent on the central atom M—halogen, F, Cl, Br and I, preferably Cl and Br), alkoxy (preferably $C_{1-4}$-alkoxy, e.g. methoxy, ethoxy, n-propoxy, i-propoxy and butoxy), aryloxy (preferably $C_{6-10}$-aryloxy, e.g. phenoxy), acyloxy (preferably $C_{1-4}$-acyloxy, e.g. acetoxy and propionyloxy) and acyl (e.g. acetyl).

Apart from the above-mentioned hydrolysable groups, further groups which may be mentioned and which are likewise suitable are hydrogen and alkoxy radicals with 5 to 20, preferably 5 to 10 carbon atoms, and halogen- and alkoxy-substituted alkoxy groups (e.g. β-methoxyethoxy).

Since the hydrolysable groups are practically no longer present in the finished coating, but are lost through hydrolysis (and condensation), the hydrolysis products have to be removed sooner or later in the process in any appropriate manner (especially if such a hydrolysis product in the coating composition used according to the invention might exert an unfavourable affect on the material to be coated or on its components). The hydrolysable groups that are preferred in particular are those which do not bear any substituents and lead to hydrolysis products of a low molecular weight, e.g. lower alcohols such as methanol, ethanol, propanol and butanols. The last-mentioned hydrolysable groups are also preferred, because they have practically no effect on the pH value during hydrolysis (in contrast to e.g. halogen).

In addition to the above-described polycondensates and optionally water and hydrolysis products from hydrolysis of the starting compounds, other components may also be present in the coating composition used according to the invention. Of course, these must not exert a harmful effect on the material to be coated.

In most cases, therefore, the coating composition used according to the invention contains a solvent for adjusting the viscosity of the preserving liquid. This solvent may be water and/or organic solvents. Of the organic solvents, those that may be named in particular are conventional solvents for lacquers and especially the lower alcohols, e.g. methanol, ethanol, propanol and the butanols, since as a rule they are already formed as by-products of the polycondensation reaction using the preferred starting materials (see above). Of course, mixtures of solvents can also be used, e.g. mixtures of the by-products formed through the hydrolysis reaction (e.g. alcohols) and other (preferably readily volatile) solvents, e.g. ethers, ketones, esters and (aliphatic or aromatic) hydrocarbons. The total content of solids in the coating composition used according to the invention is normally 10% to 75%, preferably 15% to 50%, most preferably 20% to 40% (all are percent by weight).

In the case, in particular, where at least part of the non-hydrolysable or non-hydrolysing organic groups which are bonded to central atoms M possesses reactive multiple bonds and/or other reactive groups (e.g. epoxy rings), the coating composition may also contain compounds which can react with such groups or groupings in the manner of a thermally or photochemically induced reaction. It may then prove expedient, e.g. in the presence of non-hydrolysable or non-hydrolysing organic groups with a carbon-carbon double or triple bond [e.g. (meth)acryloxyalkyl groups], to add organic unsaturated compounds to the coating composition, which can then copolymerise with these unsaturated groups of the polycondensates. Examples of such unsaturated organic compounds are styrene, acrylic acid, methacrylic acid or corresponding derivatives (e.g. esters, amides, nitriles) of the above-named acids. These compounds may also be partly or per-fluorinated. In this way, compounds may be used, which possess (per)fluorinated groups, which react during the preparation of the coating composition or the polycondensates with non-hydrolysable or non-hydrolysing non-fluorinated groups, and thereby yield fluorinated groups (e.g. by reacting S—H— or N—H— groups with hexafluoropropene oxide). It is also possible to use the above organic compounds not as such, but in the form of surface-modifying agents, which are found on particles of a nano-scale (e.g. filler particles). It is thus possible to incorporate nano-scale particles in a homogeneous distribution into the final coating. These particles render the coating resistant e.g. to rubbing or scratches, without impairing its transparency. As regards the surface modification of nano-scale (ceramic) particles, reference may be made e.g. to WO-A-93/21127. Furthermore, e.g. in the case where epoxy-containing organic groups are present on central atoms M, the coating liquid may contain compounds which can enter into (catalytic) ring-opening polymerisation with the epoxy rings, such as hydroxyl-containing and amine-group-containing compounds (e.g. phenols).

By adding the above-mentioned organic compounds, which can react with functionalised organic groups (preferably) present on the central atoms M of the polycondensates used according to the invention, it is possible to adjust the properties of the resulting coating to the special circumstances (type, quality and intended use of the material to be coated etc.).

In particular, if the organic groups in the polycondensates of the coating composition used according to the invention are groups with unsaturated carbon-carbon bonds, the coating composition preferably also contains a catalyst for the thermally and/or photochemically induced curing of the polycondensates applied to the substrate. Further, a photo-polymerisation initiator may be added. Preferably, the photoinitiators are selected from the commercially available examples: IRGACURE® (photoinitiator) 184 (1-hydroxycyclohexyl-phenylketone), IRGACURE® (photoinitiator) 500 (1-hydroxycyclohexyl-phenylketone, benzophenone and other photoinitiators of the IRGACURE® (photoinitiator) type which are available from Ciba Specialty Chemicals, Basel, Switzerland; DAROCUR® (photoinitiator) 1173, 1116, 1398, 1174 and 1020 (available from Ciba Specialty Chemicals, Basel, Switzerland), benzophenone, 2-chlorothioxanthone, 2-methylthioxanthone, 2-isopropylthioxanthone, benzoin, 4,4'-dimethoxy benzoin, benzoin ethyl ether, benzoin isopropyl ether, benzyl dimethylketal, 1,1,1-trichloroacetophenone, diethoxyacetophenone and dibenzosuberone.

The thermal initiators which may be used are, inter alia, organic peroxides in the form of diacyl peroxides, peroxydicarbonates, alkyl peresters, dialkyl peroxides, perketals, ketone peroxides and alkylhydroperoxides. Specific examples of such thermal initiators are dibenzoyl peroxide, tert.-butyl perbenzoate and azobisisobutyronitrile.

Where epoxy rings are present, the usual ring-opening catalysts may be present in the coating composition, e.g. tertiary amines (e.g. imidazole and derivatives thereof).

The above initiators are added to the coating composition in the usual quantities. For example, the initiator may be added in an amount of e.g. 0.5% to 2% by weight (based on the total quantity) to a coating composition containing 30% to 50% by weight of solids.

The coating composition produced may be brought into contact with the contact lens forming mold to be coated preferably as such or after partial or almost complete removal of the solvent employed or of the solvent formed during the reaction (e.g. the alcohols resulting from hydrolysis of the alkoxides) and/or after adding an appropriate solvent for the purpose of lowering the viscosity. Conventional additives may still be added, at latest before using the coating composition, e.g. colouring agents (pigments, dyes etc.), oxidation inhibitors, levelling agents, UV absorbers, fillers and the like.

The usual coating processes used to coat the mold are e.g. dipping, flooding, drawing, casting, spinning, spraying and brushing.

After the optionally conducted drying (preferably at room temperature or at slightly elevated temperature), the coating composition may be cured thermally and/or by irradiation in known manner, depending on the type or presence of an initiator.

In the case of thermal curing, the curing temperatures are preferably at least 50° C., most preferably at least 90° C. The maximum curing temperature is determined, inter alia, also by the thermal resistance of the substrate to be coated. Preferably, the curing temperatures may not exceed 250° C., and particularly may not exceed 180° C.

Lens forming molds may be made by all materials known in the art for making molds. Example are polymeric materials, such as polyethylene, polypropylene, polystyrene, PMMA, TOPAS® (polymeric material) COC grade 8007-S10 (clear amorphous copolymer of ethylene and norbornene, available from Ticona GmbH of Frankfurt, Germany), or quartz, glasses or sapphire. The molds may be one-way or reusable molds. Reusable molds following the production of a lens, may be cleaned rapidly and effectively from the uncrosslinked prepolymer and other residues, using water or a suitable solvent, and can be dried with air.

The coating maybe applied on both female and male optical surfaces or only on one optical surface preferably on the female optical surface.

Any lens-forming materials known in the art may be used in the invention. Preferred lens-forming materials are capable of forming hydrogels. A lens-forming material may be made up of vinylic monomers like HEMA (hydroxyethylmethacrylate) or may comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention. While the selection of a lens-forming material is largely determined upon the final modality of use of the final contact lens, the presently preferred lens material is a modified polyvinyl alcohol prepolymer as disclosed in EP-A-641806, for example nelfilcon (available from Ciba Vision Corporation, Atlanta, USA). Nelfilcon is particularly preferred because it is water soluble and finished lens of optical quality can be produced from it within a few seconds, without the necessity for subsequent extraction or finishing steps.

In a preferred embodiment, where a lens-forming material is a modified polyvinyl alcohol prepolymer, reusable molds made of glass are employed and the lens-forming material is cured actinically under a spatial limitation of actinic radiation to form a colored contact lens. The optical surface of the female mold has been previously coated with the nano-structured solution as in the embodiments above. The solution preferably comprises perfluor groups modified polysiloxan (<5.00%) and solvents such as 2-propanol (>90.00%), ethanol (<5.00%) and methanol(<0.20). The solution is preferably the solution sold under the trade name of KERONA SICHTKLAR® (solution).

The contact lens forming process is extensively described in WO-A-98/42497. The lens-forming material is dosed into the female mold. The female mold is subsequently mated with the male mold and closed. The contact lens is then formed by curing the mold with the an actinic radiation preferably UV radiation.

Preferably the lens is formed within a fully automated production plant wherein the lens formed as described above and subsequently inspected and packaged. An example of a production plant is described also in WO-A-98/42497.

In this case the coating may be applied to the mold optical surface/s off line during the periodical maintenance of the molds which is preferred or a selected station maybe integrated in the production plant to apply the coating directly on line before the dosing of the contact lens forming material into the mold. In the last case, the coating may be applied in a tampon like manner.

EXAMPLES

Example 1

A test on a semi-automatic contact les producing plant was performed employing quartz molds. The coating solution was the solution sold under the trade name of KERONA Sicht-Klar® and the contact lens forming material was nelfilcon. The test was performed on three different tracks and 36 lenses were produced on each track.

On track 1 only the female mold half was coated;
On track 2 none of the mold half was coated;
On track 3 only the male mold half was coated;
After the removal of the lens from the mold and before a new dosing step the molds were cleaned and dried by an external cleaning module with water and pressurized air.

The results are the following:
Track 1 produced 36 lenses, none with bubbles;
Track 2 produced 34 lenses, 23 with babbles;
Track 3 produced 23 lenses, none with bubbles.

In a second test the coated female mold of track 1 were employed on track 2 resulting in lenses without bubbles.

In a third test the original female mold of track 2 were coated resulting again in lenses without bubbles.

The unequivocal evidence found is that there is no influence of the dosing step (different on different tracks) or of the individual mold surface. The production of lenses without bubbles is therefore correlated to the coating of the mold surface.

The invention claimed is:

1. A contact lens forming mold, the mold having a center, and the mold comprising two mold halves, female and male mold halves, wherein at least one mold halt comprises a nano-structured fluorine-containing inorganic polycondensate coating which decreases wettability by a polyvinyl alcohol prepolymer lens forming material dosed into the mold thereby retarding spreading of the lens forming material towards the center of the mold.

2. A contact lens forming mold of claim 1 wherein the first and second mold halves, independently of each other, is made of glass or quartz.

3. A coating of claim 1 wherein the coating is on the female mold half.

4. A contact lens forming mold of claim 1 wherein the coating comprises polycondensates of one or more compounds of elements M of the main groups III to V and the subgroups II to IV of the periodic system of elements, said compounds being capable of hydrolytic polycondensation, whereby in these polycondensates, at least one organic group G having at least 2 aliphatic carbon atoms to which at least one fluorine atom is bonded to at least part of at least one central atom of element M either via one of the carbon atoms or via a linking group A.

5. A contact lens forming mold of claim 4 wherein the element M is selected from the group consisting of silicon, aluminium, boron, tin, zirconium, titanium, vanadium and zinc.

6. A contact lens forming mold of claim 4 wherein the element M is selected from the group consisting of silicon, aluminium, boron, zirconium, and titanium.

7. A contact lens forming mold of claim 4 wherein the element M is silicon.

* * * * *